Patented Dec. 3, 1929

1,738,509

UNITED STATES PATENT OFFICE

LESTER KIRSCHBRAUN, OF LEONIA, NEW JERSEY

WATERPROOF SHEET AND PROCESS OF MAKING SAME

No Drawing. Continuation of application Serial No. 404,014, filed August 16, 1920. This application filed July 19, 1928. Serial No. 294,043.

This application is a continuation of my co-pending application, Serial No. 404,014, filed August 16, 1920.

This invention relates to improvements in waterproof sheets and process of making same, and refers more particularly to waterproof sheets preferably felted, made from cotton stalks or analogous paper making fibres, saturated or impregnated with a waterproofing agent.

Among the objects of the invention are to provide a waterproof sheet consisting of felted cotton stalks or analogous paper making fibres which, simultaneously with the felting operation, are impregnated or saturated with a waterproofing agent, as for example, rubber or asphalt, or combinations thereof.

The invention may be carried out as follows: I preferably take rubber and flux it with a bituminous material, such as asphalt or coal tar pitch, on calender rolls, in the usual way. I then gradually add this rubber compound while it is in a more or less heated plastic condition to a relatively stiff paste of colloidal clay and water, the latter being in a heated condition, as for example, 180° F. The rubber compound is added to the paste in the well known types of kneading or masticating machines, so as to permit the rubber compound to become gradually dispersed in very small particles in the aqueous paste. This mixture is then thinned with the water and forms a non-adhesive emulsified matrix in which the rubber compound is dispersed through the water.

This emulsion is then mixed with pulp stock formed from cotton stalks or analogus paper making fibres and the mixture sufficiently thinned with water to permit of it readily flowing over a paper machine where the fibrous constituents thereof are felted. As the water is removed the dispersed particles of the binder coalesce and unite to form a continuous film throughout the felted sheet of fibrous stock.

If it is desired to vulcanize the sheet thus formed, a vulcanizing agent, as sulphur, may be incorporated with the emulsion and the sheet is vulcanized as it passes over the drying rolls of the paper machine or over hot calender rolls.

The sheets thus formed may be used as rubber blankets, for waterproof packages, for rubber gaskets, shoe elements, and in fact for a wide variety of usage.

It may be desirable, instead of using fibrous stock entirely, to mix it with a certain percentage of asbestos fibre in order to get a more heat resisting stock, as for example, gaskets subjected to a high temperature.

I claim as my invention:

1. A sheet consisting of a felted fibrous material, a coalesced rubber compound extending through the sheet and containing an argillaceous colloid.

2. A waterproof sheet comprising felted fibrous material and including coalesced rubber extending through the sheet and containing an argillaceous colloid, possessing the characteristics of a product in which the fibrous constituents have been impregnated with the rubber simultaneously with the felting operation.

3. A process of making a felted fibrous sheet consisting in making an emulsion including water, rubber and an argillaceous colloidal emulsifying agent, mixing this with fibrous pulp, forming this mixture into sheets, removing the water and permitting the rubber to unite with the fibre.

4. A fibrous sheet comprising felted fibres having incorporated therewith a binder substance including rubber and colloidal clay united with the fibres.

5. A waterproof sheet, consisting of a felted fibrous material, a waterproof binder substance comprising a mixture of rubber and bituminous substances containing a colloidal clay coalesced with the fibres.

6. A process of making a felted fibrous sheet comprising making an emulsion including water, rubber and colloidal clay, mixing this with fibrous pulp, forming this mixture into sheets, removing the water and permitting the rubber to unite with the fibre.

7. A waterproof sheet, consisting of a felted fibrous material, a waterproof binder substance comprising a mixture of rubber and bituminous substances containing an argilliferous emulsifying agent coalesced with the fibres.

8. A process of making fibrous articles containing rubber consisting in plasticizing the rubber by milling, dispersing the plasticized rubber with a colloid in an aqueous vehicle so as to form an emulsion capable of being thinned with water, in thereafter mixing fibrous pulp with said emulsion, felting the mixture, removing the water and permitting the rubber to coalesce.

9. A process of making a fibrous sheet containing rubber consisting in plasticizing the rubber by milling, and dispersing it with a colloid in an equeous vehicle so as to form an emulsion capable of being thinned with water, in then mixing fibrous pulp with said emulsion, sheeting the mixture on a paper forming machine, drying the sheet and permitting the rubber to coalesce.

10. The process of making a fibrous sheet containing rubber consisting in subjecting the said rubber to the action of calendering rolls, in then dispersing the rubber with a colloid in an equeous vehicle to produce an emulsion capable of being thinned with water, in then mixing fibrous pulp with said emulsion, sheeting the mixture on a paper forming machine, drying the sheet and permitting the rubber to coalesce.

11. The process of making paper which consists in adding to paper pulp prior to passing the pulp through a paper-making machine, a non-adhesive rubber-containing emulsion, mixing the rubber-containing emulsion with the pulp stock and passing the mixed stock through a paper making machine.

12. A process of making paper which consists in adding to the paper pulp a rubber-containing emulsion, mixing the emulsion with the pulp stock, passing the mixed stock over a paper-making machine and introducing an agent to vulcanize the rubber contained in the resulting paper.

13. A waterproof sheet composed of cotton stalk fibres and a rubber containing compound impregnating and securing together the cotton stalk fibres.

14. A waterproof sheet composed of cotton stalk fibres impregnated and secured together by a rubber containing substance, and felted upon a paper-making machine.

15. A process of making fibrous articles containing rubber, which consists in adding to fibrous pulp a rubber containing substance, comprising relatively small particles of rubber suspended in a fluid vehicle, mixing the mass to thoroughly distribute the rubber throughout the pulp, and in then passing the mixed pulp and rubber through a paper-making machine.

16. A process of making fibrous articles containing rubber, which consists in adding to fibrous pulp a rubber containing substance, mixing the mass to thoroughly disperse the rubber throughout the pulp, passing the mixed pulp and rubber through a paper-making machine, and in vulcanizing the resultant article.

17. A process of making fibrous articles containing rubber, which consists in adding to fibrous pulp a rubber containing substance, mixing the mass to thoroughly disperse the rubber throughout the pulp, passing the mixed pulp and rubber through a paper-making machine, and in introducing and incorporating a vulcanizing agent with the mixture.

18. A process of making fibrous articles, which consists in adding to the fibrous pulp a rubber containing emulsion, mixing the pulp and the emulsion to thoroughly distribute the emulsion throughout the pulp material, adding a vulcanizing agent, and passing the mass through a paper making machine to form the resultant article.

19. The process of making paper which consists in adding a rubber emulsion to a fibrous material possessing the characteristics of high porosity and composed of loosely matted long fibres, mixing the fibrous material and the rubber emulsion, and in finally forming the resultant article by passing the mixture through a paper making machine.

20. The process of felting fibrous articles comprising the steps of forming a viscous paste of a fluid vehicle and an emulsifying agent, adding a rubber substance to the paste, thoroughly agitating the mixture to disperse small particles of the rubber compound through the vehicle, mixing the resultant emulsion with fibrous material, and in then passing the mixture of rubber emulsion and fibrous material through a paper making machine to produce the resultant article.

21. The process of making waterproof fibrous articles which comprises the steps of first forming a paste consisting of an emulsifying agent and a fluid vehicle, adding a rubber containing substance to the mixture, and agitating the same together to thoroughly disperse small particles of the rubber through the fluid vehicle and obtain a non-adhesive emulsion matrix, and in then mixing the emulsion with fibrous material and passing the mixture through a paper making machine to produce the resultant waterproof articles.

22. A process of making a waterproof sheet which comprises mixing with fibrous stock rubber dispersed in finely divided particles in the form of a non-adhesive aqueous emulsion, sheeting the mixture on a paper machine, and removing the water to permit the rubber to unite with the fibers.

23. A process of making a waterproof sheet which comprises mixing with fibrous stock rubber dispersed in finely divided particles in the form of a non-adhesive aqueous emulsion, sheeting the mixture on a paper machine, and removing the water to permit the dispersed particles of rubber to coalesce and unite to form a continuous film about the fibers.

24. The herein described process, which comprises mixing in water, paper making stock and a non-adhesive emulsion containing rubber waterproofing material and an emulsifying agent, and forming on a paper making machine a sheet from said mixture.

In testimony whereof I affix my signature.

LESTER KIRSCHBRAUN.